US011326492B2

(12) United States Patent
Shah

(10) Patent No.: US 11,326,492 B2
(45) Date of Patent: May 10, 2022

(54) HYDROCARBON DOSING SYSTEM

(71) Applicant: ROTEX AUTOMATION LIMITED, Gujarat (IN)

(72) Inventor: Nirav Shah, Gujarat (IN)

(73) Assignee: ROTEX AUTOMATION LIMITED, Gujarat (IN)

( * ) Notice: Subject to any disclaimer, the term of this patent is extended or adjusted under 35 U.S.C. 154(b) by 0 days.

(21) Appl. No.: 16/640,085

(22) PCT Filed: Nov. 8, 2019

(86) PCT No.: PCT/IB2019/059609
§ 371 (c)(1),
(2) Date: Feb. 19, 2020

(87) PCT Pub. No.: WO2020/095259
PCT Pub. Date: May 14, 2020

(65) Prior Publication Data
US 2021/0363904 A1    Nov. 25, 2021

(30) Foreign Application Priority Data

Nov. 9, 2018 (IN) .............................. 201821042220
Dec. 26, 2018 (IN) .............................. 201821049090
Oct. 24, 2019 (IN) .............................. 201921043388

(51) Int. Cl.
*F01N 3/36* (2006.01)
*B01D 53/94* (2006.01)
(Continued)

(52) U.S. Cl.
CPC ............... *F01N 3/208* (2013.01); *F01N 3/36* (2013.01); *B01D 53/944* (2013.01);
(Continued)

(58) Field of Classification Search
CPC ........ F01N 3/208; F01N 3/36; F01N 2610/03; F01N 2900/1808; B01D 53/944;
(Continued)

(56) References Cited

U.S. PATENT DOCUMENTS 5,884,475 A * 3/1999 Hofmann ............... F23J 15/003
60/274
8,671,664 B2 * 3/2014 Garcia ..................... F01N 3/36
60/286

(Continued)

*Primary Examiner* — Mahmoud Gimie
(74) *Attorney, Agent, or Firm* — Nolte Lackenbach Siegel

(57) ABSTRACT

The present disclosure relates to a hydrocarbon dosing system to control dosing of diesel fuel into an exhaust upstream of a vehicle's oxidation catalyst (VOC). The system 100 includes separate inlets (102,104) to allow inflow of a first fluid and the second fluid into the system, and an outlet 116. The first fluid configured to facilitate purging of the second fluid into the VOC through the outlet 116. The system 100 incorporates multiple valves (106, 108, 112) and pressure sensor 114 to control dosing and purging of the fluids. The system 100 provides an intrinsic non-return valve mechanism to restrict the flow of the first fluid into a fluid path of the second fluid, and vice versa. The system 100 provides intrinsic pressure relief mechanism for controlled release of pressure from system 100. The system 100 includes additional optional check valves 208 and filter screens 206 for redundancy purposes.

10 Claims, 15 Drawing Sheets

(51) Int. Cl.
   *F02M 43/04* (2006.01)
   *F02M 63/00* (2006.01)
   *F01N 3/20* (2006.01)

(52) U.S. Cl.
   CPC .. *F01N 2610/03* (2013.01); *F01N 2900/1808* (2013.01); *F02M 43/04* (2013.01); *F02M 63/00* (2013.01); *F02M 63/0005* (2013.01); *F02M 63/0015* (2013.01); *F02M 63/0059* (2013.01); *F02M 63/0078* (2013.01)

(58) Field of Classification Search
   CPC .... F02M 43/04; F02M 63/00; F02M 63/0005; F02M 63/0015; F02M 63/0059; F02M 63/0078
   USPC ........................................................ 137/606
   See application file for complete search history.

(56) References Cited

U.S. PATENT DOCUMENTS

| | | | | |
|---|---|---|---|---|
| 9,032,710 | B2* | 5/2015 | White | F01N 3/36 60/286 |
| 2006/0101810 | A1* | 5/2006 | Angelo | F01N 3/2066 60/286 |
| 2008/0223340 | A1* | 9/2008 | Duffield | F01N 3/0253 123/434 |
| 2011/0016854 | A1* | 1/2011 | Gaudin | F01N 3/0253 60/299 |

* cited by examiner

HYDROCARBON DOSING SYSTEM

PRIORITY

The present application claims the benefit of PCT/IB2019/059609 filed on Nov. 8, 2019 which claims the benefit of the Indian provisional Application No. 201821042220 filed on Nov. 9, 2018, Indian provisional Application No. 201821049090 filed on Dec. 26, 2018 and Indian provisional Application No. 201921043388 filed on Oct. 24, 2019, the entire disclosures of which are relied on for all purposes and are incorporated into this application by reference.

TECHNICAL FIELD

The present disclosure relates to the field of hydrocarbon dosing system. More particularly, the present disclosure relates to a hydrocarbon dosing system to control dosing of diesel fuel into an exhaust upstream of a vehicle's oxidation catalyst.

BACKGROUND

Background description includes information that may be useful in understanding the present invention. It is not an admission that any of the information provided herein is prior art or relevant to the presently claimed invention, or that any publication specifically or implicitly referenced is prior art.

Exhaust gases emitted from motor vehicles have been the major source of air pollution. This has forced government and federal bodies all over the world to institute stringent norms and standards to regulate the output of air pollutants from motor vehicle's engine.

Automobile and engine manufacturers are bound to follow these stringent norms and develop emission improvement strategies and technologies for motor vehicle's engine. Efforts have been made around reducing air pollutants such as particulate matters, hydrocarbon and carbon monoxide, nitrogen oxide, etc from the exhaust gases emitted by the engine.

Diesel oxidation catalyst (DOC) is one of the aftermath components used in diesel engines that are designed to convert highly toxic air pollutants such as carbon monoxide and unburned hydrocarbons into carbon dioxide and water. DOC is being implemented in all diesel engine vehicles to meet these vehicle norms and standard. Diesel engine vehicle incorporates a hydrocarbon dosing system to provide controlled dosing of diesel fuel and air into an exhaust upstream of vehicle's DOC.

Various hydrocarbon dosing systems are available in the automobile industry to provide dosing of diesel fuel and air into vehicle's DOC. Present hydrocarbon dosing systems incorporate separate inlets for diesel fuel and air to enter into a dosing channel. The dosing channel is connected to a nozzle to purge out the diesel fuel. The available dosing systems have several drawbacks such as reverse flow of diesel fuel into the air inlet line, and vice versa, which increases malfunction possibilities in the dosing system. Another drawback of currently available dosing system is increased resistance to the flow of fluids in the inside the dosing system.

Dosing systems available in the market incorporate multiple valves such as a check valve or non-return valve (NRV) to restrict the flow of diesel fuel in the channel of the dosing system, and vice versa. Another set of pressure relief valve are incorporated in dosing systems for releasing pressure of the dosing system in case the pressure inside the dosing system exceeds beyond working limits. In addition, separate pressure sensors are used for monitoring the pressure of the diesel fuel and air inside the dosing system The incorporation of these additional sets of components such as NRVs, check valves, pressure relief valves and pressure sensors into the dosing system significantly increases the overall weight and manufacturing cost of the dosing system as well as the vehicle. In addition, use of these additional set of components increases the resistance to fluid and also increases the chances of malfunctioning of the dosing system.

There is, therefore, a. need to provide a dosing system for controlled injection of air and reducing agent like diesel warrants prudent selection and interconnection of control valves around a robust structure that provides flow paths with least path resistance, reduced number of valves and minimum malfunction possibilities.

OBJECTS OF THE PRESENT DISCLOSURE

Some of the objects of the present disclosure, which at least one embodiment herein satisfies are as listed herein below.

It is an object of the present disclosure to provide a hydrocarbon dosing system to control dosing of diesel fuel into an exhaust upstream of a vehicle's oxidation catalyst.

It is an object of the present disclosure to provide a hydrocarbon dosing system that has minimum leakage possibilities in the fluid paths.

It is an object of the present disclosure to provide a hydrocarbon dosing system that provides intrinsic non-return valve (NRV) mechanism without any additional non-return check valves.

It is an object of the present disclosure to provide a hydrocarbon dosing system that provides intrinsic pressure relief valve mechanism without any additional pressure relief valves.

It is an object of the present disclosure to provide a hydrocarbon dosing system that has provision for accommodation of optional check valves for additional safety.

It is an object of the present disclosure to provide a hydrocarbon dosing system that has a flow path of minimum resistance and length, and reduced weight and size.

It is an object of the present disclosure to provide a hydrocarbon dosing system that has reduced air consumption for purging.

It is an object of the present disclosure to provide a hydrocarbon dosing system that facilitates deploying of minimum number of electrical devices so as to have minimum failure possibilities.

It is an object of the present disclosure to provide a hydrocarbon dosing system that facilitates injection of only one fluid or two fluids together, as required.

SUMMARY

The present disclosure relates to the field of hydrocarbon dosing system. More particularly, the present disclosure relates to a hydrocarbon dosing system to control dosing of diesel fuel into an exhaust upstream of a vehicle's oxidation catalyst.

An aspect of the present disclosure pertains to a hydrocarbon dosing system, the system comprising: a housing comprising a first inlet to facilitate inflow of a first fluid into the housing, a second inlet to facilitate inflow of a second fluid into the housing, and an outlet to facilitate outflow of any or a combination of the first fluid and second fluid from the housing, wherein the first inlet, the second inlet, and the outlet may be fluidically coupled to each other through a first conduit; at least one fluid flow enabler disposed at least partially inside the housing and operatively coupled to the first inlet and the second inlet, the at least one fluid flow enabler may be configured to control flow of any or a combination of the first fluid, and the second fluid from the first inlet and the second inlet to the outlet; a common fluid flow enabler disposed at least partially inside the housing, the common fluid flow enabler may be configured to control flow of the first fluid and the second fluid inside the housing to facilitate dosing of the first fluid and the second fluid to provide a dosed fluid; wherein the system may be configured to provide an intrinsic check valve mechanism to restrict flow of the first fluid towards the second inlet, and restrict flow of the second fluid towards the first inlet.

In an aspect, the system may comprise at least one pressure sensor to monitor pressure of any or a combination of the first fluid and the second fluid inside the housing.

In an aspect, the system may be configured to provide an intrinsic pressure relief valve mechanism to control pressure of the second fluid inside the housing and enable controlled discharge of the second fluid from the housing when the pressure of the second fluid inside the housing exceeds a predefined pressure.

In an aspect, the system may comprise a control unit operatively coupled to the at least one fluid flow enabler, the common fluid flow enabler, and the at last one pressure sensor, and wherein the control unit may be configured to control the at least one fluid flow enabler, and the common fluid flow enabler to regulate the flow of any or a combination of the first fluid and the second fluid through the system.

In an aspect, the at least one fluid flow enabler, and the common fluid flow enabler may be solenoid valves, and wherein the at least one fluid flow enabler may comprise: a first fluid flow enabler operatively coupled to the first inlet and configured to control flow of the first fluid in the housing; and a second fluid flow enabler operatively coupled to the second inlet and configured to control flow of the second fluid in the housing.

In an aspect, the at least one fluid flow enabler may be a 3/2 solenoid valve provided with a valve outlet, and two valve inlets comprising a first valve inlet and a second valve inlet, and wherein the first valve inlet may be fluidically coupled to the first inlet, the second valve inlet may be fluidically coupled to the second inlet, and the valve outlet may be fluidically coupled to the outlet.

In an aspect, the housing may be configured to accommodate at least one check valve, and wherein the at least one check valve may be configured to restrict flow of the first fluid towards the second inlet, and flow of the second fluid towards the first inlet, when the system may be in operating condition.

In an aspect, the first fluid may comprise any or a combination of air, oxygen, and oxidizing agents, and wherein the second fluid may comprise any or a combination of diesel, and bio-fuel.

In an aspect, the system may comprise a nozzle coupled to the outlet through a dosing conduit to regulate outflow of any or a combination of the first fluid, the second fluid, and the dosed fluid from the outlet.

In an aspect, the at least one fluid flow enabler may be configured to allow flow of the first fluid from the first inlet to the outlet to facilitate purging of any or a combination of the first conduit, the outlet, the dosing conduit, and the nozzle.

Another aspect of the present disclosure pertains to a hydrocarbon dosing system, the system may comprising: a housing comprising a first inlet to facilitate inflow of a first fluid into the housing, a second inlet to facilitate inflow of a second fluid into the housing, and an outlet to facilitate outflow of any or a combination of the first fluid and second fluid from the housing, wherein the first inlet, the second inlet, and the outlet may be fluidically coupled to each other through a first conduit; at least one fluid flow enabler disposed at least partially inside the housing and may be operatively coupled to the first inlet and the second inlet, the at least one fluid flow enabler may be configured to control flow of any or a combination of the first fluid, and the second fluid from the first inlet and the second inlet to the outlet; and a common fluid flow enabler disposed at least partially inside the housing, the common fluid flow enabler may be configured to control flow of the first fluid and the second fluid inside the housing to facilitate dosing of the first fluid and the second fluid to provide a dosed fluid; wherein the system may be configured to provide an intrinsic pressure relief valve mechanism to control pressure of the second fluid inside the housing and enable controlled discharge of the second fluid from the housing when the pressure of the second fluid inside the housing exceeds a predefined pressure.

BRIEF DESCRIPTION OF THE DRAWINGS

The accompanying drawings are included to provide a further understanding of the present disclosure and are incorporated in and constitute a part of this specification. The drawings illustrate exemplary embodiments of the present disclosure and, together with the description, serve to explain the principles of the present disclosure.

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1A:
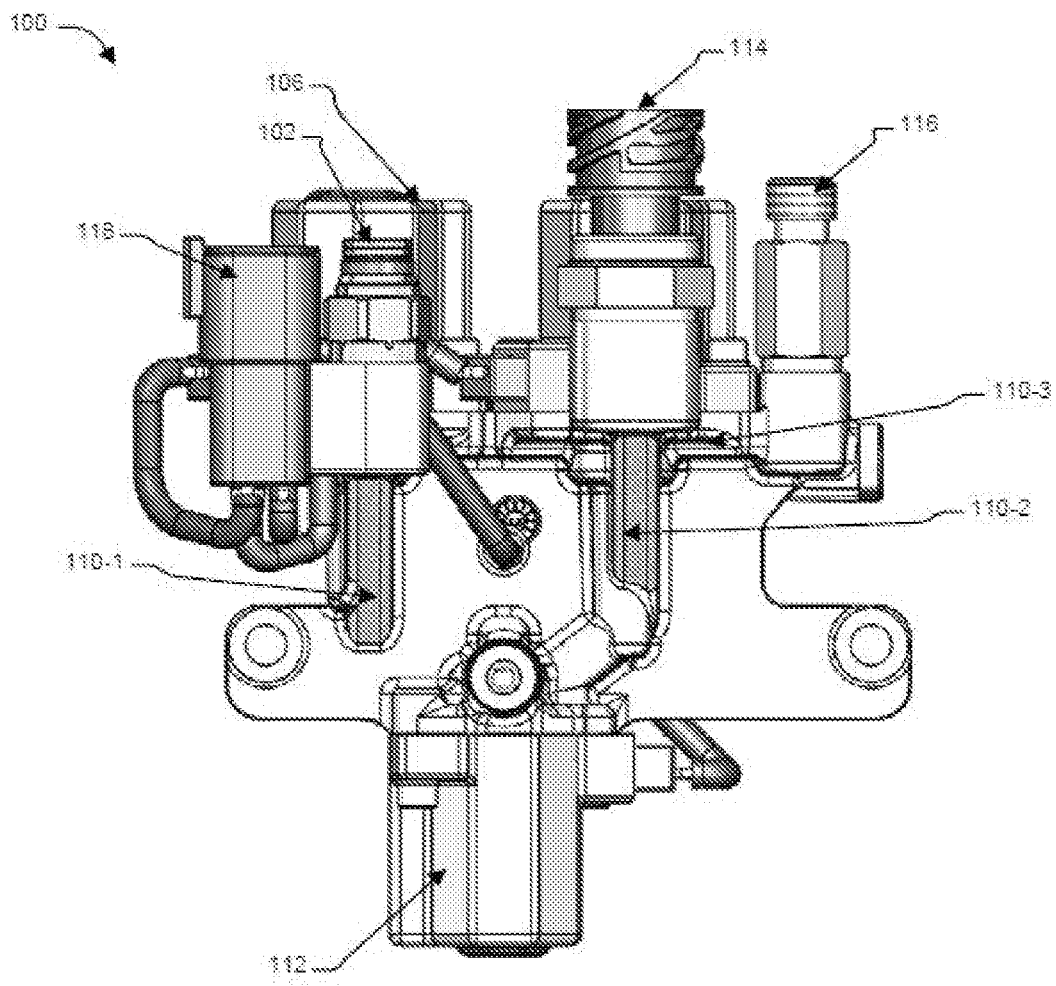
FIG. 1A-1B illustrates perspective views of a first embodiment of the proposed hydrocarbon dosing system, in accordance with an exemplary embodiment of the present disclosure.

The following is a detailed description of embodiments of the disclosure depicted in the accompanying drawings. The embodiments are in such detail as to clearly communicate the disclosure. However, the amount of detail offered is not intended to limit anticipated variations of embodiments; on the contrary, the intention is to cover all modifications, equivalents, and alternatives falling within the spirit and scope of the present disclosure as defined by the appended claims.

Various terms as used herein are shown below. To the extent a term used in a claim is not defined below, it should be given the broadest definition persons in the pertinent art have given that term as reflected in printed publications and issued patents at the time of filing.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

In the specification, reference may be made to the spatial relationships between various components and to the spatial orientation of various aspects of components as the devices are depicted in the attached drawings. However, as will be recognized by those skilled in the art after a complete reading of the present application, the devices, members, devices, etc. described herein may be positioned in any desired orientation. Thus, the use of terms such as "above," "below," "upper," "lower," or other like terms to describe a. spatial relationship between various components or to describe the spatial orientation of aspects of such components should be understood to describe a relative relationship between the components or a spatial orientation of aspects of such components, respectively, as the device described herein may be oriented in any desired direction.

The present disclosure relates to the field of hydrocarbon dosing system. More particularly, the present disclosure relates to a hydrocarbon dosing system to control dosing of diesel fuel into an exhaust upstream of a vehicle's oxidation catalyst.

According to an aspect, the present disclosure pertains to a hydrocarbon dosing system, the system including: a housing including a first inlet to facilitate inflow of a first fluid into the housing, a second inlet to facilitate inflow of a second fluid into the housing, and an outlet to facilitate outflow of any or a combination of the first fluid and second fluid from the housing, wherein the first inlet, the second inlet, and the outlet can be fluidically coupled to each other through a first conduit; at least one fluid flow enabler disposed at least partially inside the housing and operatively coupled to the first inlet and the second inlet, the at least one fluid flow enabler can be configured to control flow of any or a combination of the first fluid, and the second fluid from the first inlet and the second inlet to the outlet; a common fluid flow enabler disposed at least partially inside the housing, the common fluid flow enabler can be configured to control flow of the first fluid and the second fluid inside the housing to facilitate dosing of the first fluid and the second fluid to provide a dosed fluid; wherein the system can be configured to provide an intrinsic check valve mechanism to restrict flow of the first fluid towards the second inlet, and restrict flow of the second fluid towards the first inlet.

In an embodiment, the system can include at least one pressure sensor to monitor pressure of any or a combination of the first fluid and the second fluid inside the housing.

In an embodiment, the system can be configured to provide an intrinsic pressure relief valve mechanism to control pressure of the second fluid inside the housing and enable controlled discharge of the second fluid from the housing when the pressure of the second fluid inside the housing exceeds a predefined pressure.

In an embodiment, the system can include a control unit operatively coupled to the at least one fluid flow enabler, the common fluid flow enabler, and the at last one pressure sensor, and wherein the control unit can be configured to control the at least one fluid flow enabler, and the common fluid flow enabler to regulate the flow of any or a combination of the first fluid and the second fluid through the system.

In an embodiment, the at least one fluid flow enabler, and the common fluid flow enabler can be solenoid valves, and wherein the at least one fluid flow enabler can include: a first fluid flow enabler operatively coupled to the first inlet and configured to control flow of the first fluid in the housing; and a second fluid flow enabler operatively coupled to the second inlet and configured to control flow of the second fluid in the housing.

In an embodiment, the at least one fluid flow enabler can be a 3/2 solenoid valve provided with a valve outlet, and two valve inlets including a first valve inlet and a second valve inlet, and wherein the first valve inlet can be fluidically coupled to the first inlet, the second valve inlet can be fluidically coupled to the second inlet, and the valve outlet can be fluidically coupled to the outlet.

In an embodiment, the housing can be configured to accommodate at least one check valve, and wherein the at least one check valve can be configured to restrict flow of the first fluid towards the second inlet, and flow of the second fluid towards the first inlet, when the system can be in operating condition.

In an embodiment, the first fluid can include any or a combination of air, oxygen, and oxidizing agents, and wherein the second fluid can include any or a combination of diesel, and bio-fuel.

In an embodiment, the system can include a nozzle coupled to the outlet through a dosing conduit to regulate outflow of any or a combination of the first fluid, the second fluid, and the dosed fluid from the outlet.

In an embodiment, the at least one fluid flow enabler can be configured to allow flow of the first fluid from the first inlet to the outlet to facilitate purging of any or a combination of the first conduit, the outlet, the dosing conduit, and the nozzle.

According to another aspect, the present disclosure pertains to a hydrocarbon dosing system, the system including: a housing including a first inlet to facilitate inflow of a first fluid into the housing, a second inlet to facilitate inflow of a second fluid into the housing, and an outlet to facilitate outflow of any or a combination of the first fluid and second fluid from the housing, wherein the first inlet, the second inlet, and the outlet can be fluidically coupled to each other through a first conduit; at least one fluid flow enabler disposed at least partially inside the housing and can be operatively coupled to the first inlet and the second inlet, the at least one fluid flow enabler can be configured to control flow of any or a combination of the first fluid, and the second fluid from the first inlet and the second inlet to the outlet; and a common fluid flow enabler disposed at least partially inside the housing, the common fluid flow enabler can be configured to control flow of the first fluid and the second fluid inside the housing to facilitate dosing of the first fluid and the second fluid to provide a dosed fluid. wherein the system can be configured to provide an intrinsic pressure relief valve mechanism to control pressure of the second fluid inside the housing and enable controlled discharge of the second fluid from the housing when the pressure of the second fluid inside the housing exceeds a predefined pressure.

Figure 1B:
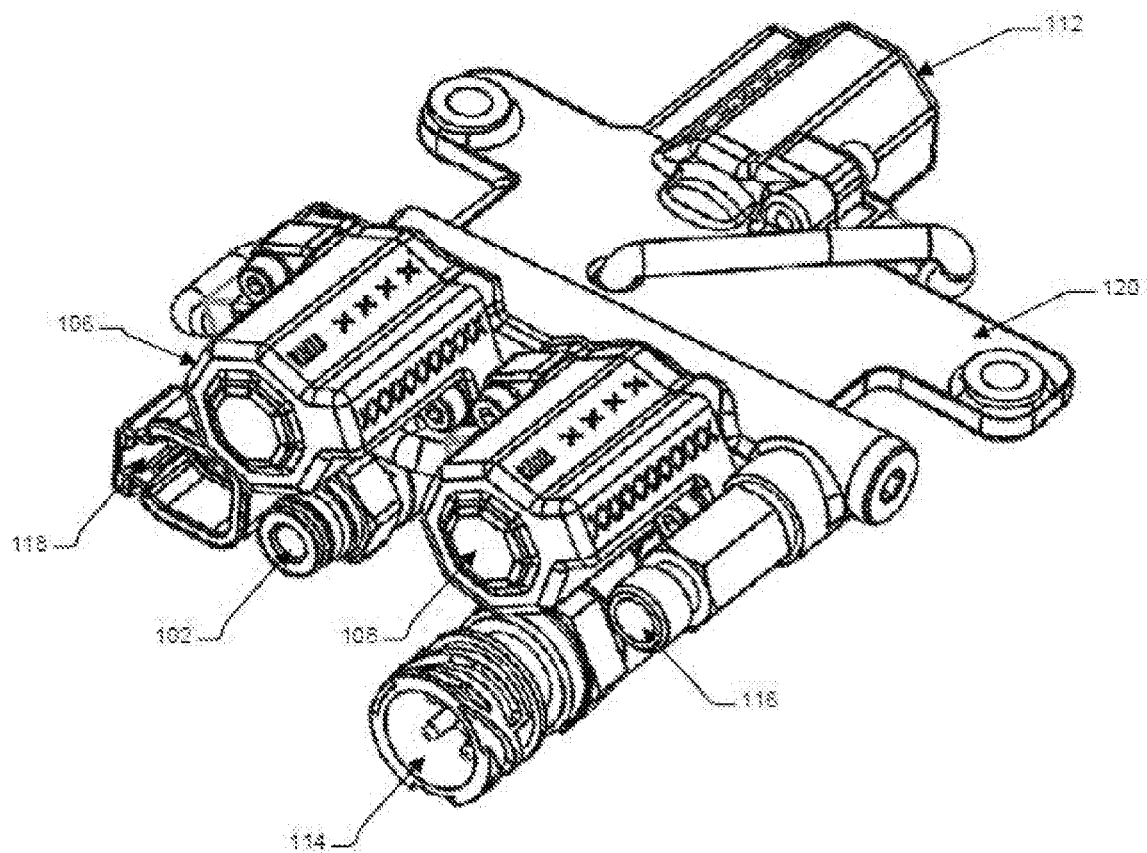

FIG. 1A-1B illustrates perspective views of a first embodiment of the proposed hydrocarbon dosing system, in accordance with an exemplary embodiment of the present disclosure.

Figure 1C:
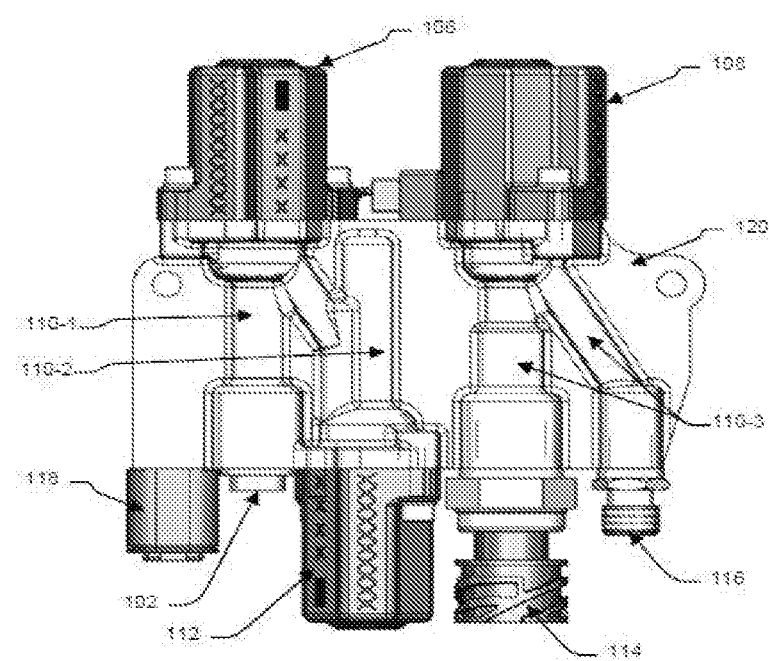
FIG. 1C-1D illustrates perspective views of a second embodiment of the proposed hydrocarbon dosing system, in accordance with an exemplary embodiment of the present disclosure
Figure 1D:
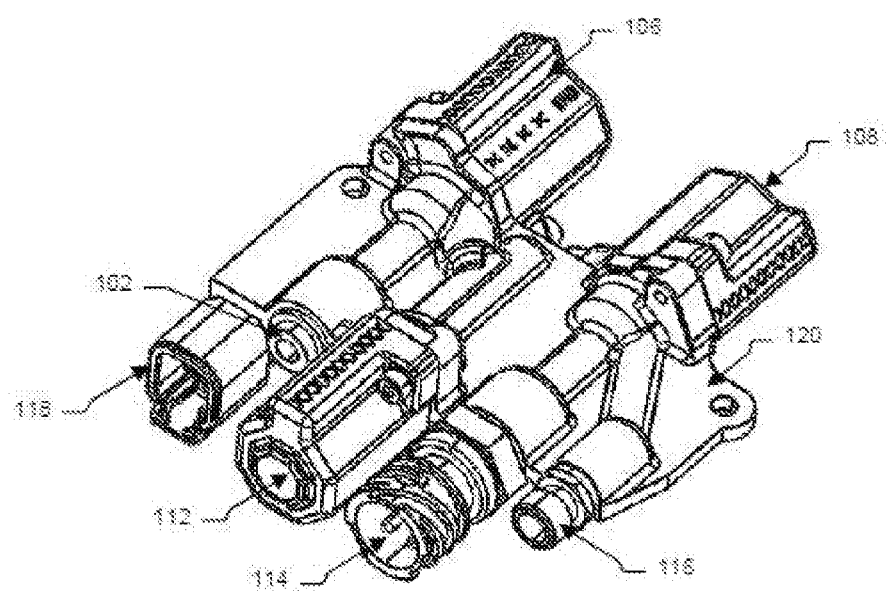

FIG. 1C-1D illustrates perspective views of a second embodiment of the proposed hydrocarbon dosing system, in accordance with an exemplary embodiment of the present disclosure.

Referring to FIG. 1A-1D, the proposed hydrocarbon dosing system 100 can include a housing 120 provided with a first conduit 110-1, 110-2, 110-3 (collectively referred to as first conduit 110 or fluid path 110, herein) to facilitate flow of any or a combination of a first fluid and a second fluid inside the housing of the system 100. The housing 120 can include a first inlet 102 and a second inlet 104 fluidically coupled to the fluid path 110. The first inlet 102 configured to facilitate flow of the first fluid into the fluid path 110, and the second inlet 104 can be configured to facilitate flow of the second fluid into the fluid path 110. The system 100 can include at least one outlet 116 (also referred to as outlet 116, herein) fluidically coupled to the first inlet 102 and the second inlet 104 through the fluid path 110.

In an embodiment, the fluid path 110 can include a first fluid path 110-1 that can be a separate fluid path for the first fluid, a second fluid path 110-2 that can be a separate fluid path for the second fluid, and a common fluid path 110-3 that can be a common path for any or a combination of the first fluid and the second fluid. The fluid path 110 can facilitate fluidically coupling of the first inlet 102, the second inlet 104, and the outlet 116 to each other.

In an embodiment, the first fluid can be any or a combination of air, oxygen and oxidizing agents, but not limited to the likes. In another embodiment, the second fluid can be any or a combination of a diesel fuel and a bio-fuel, but not limited to the likes.

In an embodiment, the system 100 can include a first fluid flow enabler 106 operatively coupled to the first inlet 102 and configured to control the flow of the first fluid inside the fluid path 110. The system 100 can include a second fluid flow enabler 112 operatively coupled to the second inlet 104 to control the flow of the second fluid inside the fluid path 110. The system 100 can include a third fluid flow enabler 108 (also referred to as common fluid flow enabler 108, herein) to control the flow of the second fluid inside the fluid path 110.

In an embodiment, the first fluid flow enabler 106, the second fluid flow enabler 112. and the third fluid flow enabler 108 can be a solenoid valve, but not limited to the likes.

In an embodiment, the system 100 can include at least one parameter sensor 114 (also referred to as parameter sensor, herein) to monitor one or more parameters corresponding to the fluids flowing inside the system 110. In another exemplary embodiment, the parameter sensor 114 can be a pressure sensor configured to monitor pressure of any or a combination of the first fluid and the second fluid inside the system 100.

In an embodiment, the first fluid flow enabler 106, the second fluid flow enabler 112, the third fluid flow enabler106, and the parameter sensor 114 can be positioned at least partially inside the housing 120 of the system 100.

In an embodiment, the system can include an electrical connector 118, which can get electrical signals from an electronic control unit (ECU). The electrical connector 118 can be operatively coupled to the first fluid flow enabler 106, the second fluid flow enabler 112, and the third fluid flow enabler 108. The electrical connector 118 can be configured to control the first fluid flow enabler 106, the second fluid flow enabler 112, and the third fluid flow enabler 108 to regulate the flow of the any or a combination of the first fluid and the second fluid inside the system 100.

In an embodiment, the parameter sensor 114 can be operatively coupled to the ECU through the electrical connector 118.

In an exemplary embodiment, the housing 120 can be made of a castable metal or a non-metal. The fluid path 110 can be free from any linear openings to reduce the number of blocking plugs in the housing 120, thereby reducing any possible leakage of fluids from the housing 120.

Figure 2A:
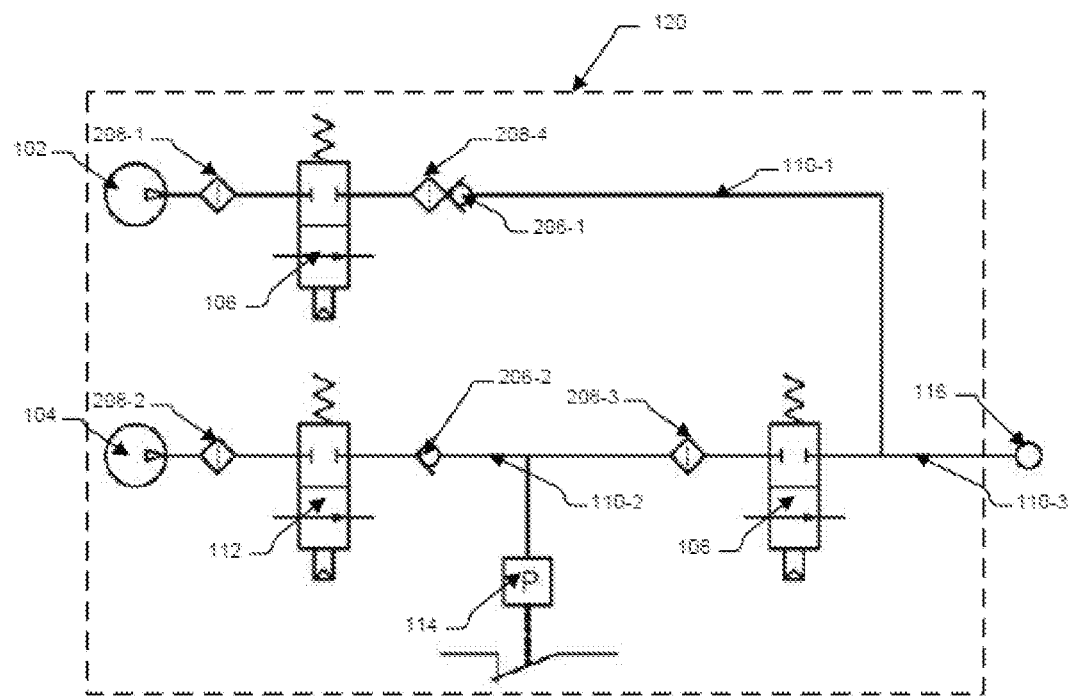
FIG. 2A illustrates line diagram of a first embodiment of the proposed system, in accordance with an exemplary embodiment of the present disclosure.

FIG. 2A illustrates line diagram of a first embodiment of the proposed system, in accordance with an exemplary embodiment of the present disclosure.

As illustrated, in an embodiment, the first inlet 102 can allow inflow of the first fluid into the system 100. The first fluid flow enabler 106 can then facilitate the first fluid to flow through the first fluid path 110-1 to the common fluid path 110-3.

In an embodiment, the first fluid path 110-1 can include an optional first filter 208-1 between the first inlet 102 and the first fluid flow enabler 106. The housing 120 can include an optional second filter 208-4 with an optional first check valve 206-1 for redundancy between the common fluid path 110-3 and the first fluid flow enabler 106, In an embodiment, the second inlet 104 can allow inflow of the second fluid inside the system 100. The second fluid flow enabler 112 can then facilitate the second fluid to flow through the second fluid path 110-2. The system 100 can include a parameter sensor 114 positioned between the second fluid flow enabler 112 and the third fluid flow enabler 108. The parameter sensor 114 can be a pressure sensor, which can monitor pressure of the second fluid inside the system 100. The third fluid flow enabler 108 can further facilitate the flow of the second fluid towards the common fluid path 110-3. The flow of the first fluid and the second fluid into the common fluid path 110-3 can result into dosing to produce a dosed fluid having a mixture of the first fluid and the second fluid or let them pass individually as and when required.

In an embodiment, the second fluid path 110-2 can include an optional third filter 208-2 between the second inlet 104 and the second fluid flow enabler 112. The housing 120 can include a fourth filter 208-3 and an optional second check valve 206-2 for redundancy between the second fluid enabler 112 and the pressure sensor 114. Further, the housing 120 can include an optional third check valve 206-3 for redundancy between the pressure sensor 114 and the common fluid enabler 108.

In an embodiment, the outlet 116 can facilitate outflow of the dosed fluid from the common fluid path 110-3 into a dosing line. The system can include a nozzle fluidically coupled to the at least one outlet 116 by the dosing line, to regulate the outflow of the dosed fluid.

Figure 2B:
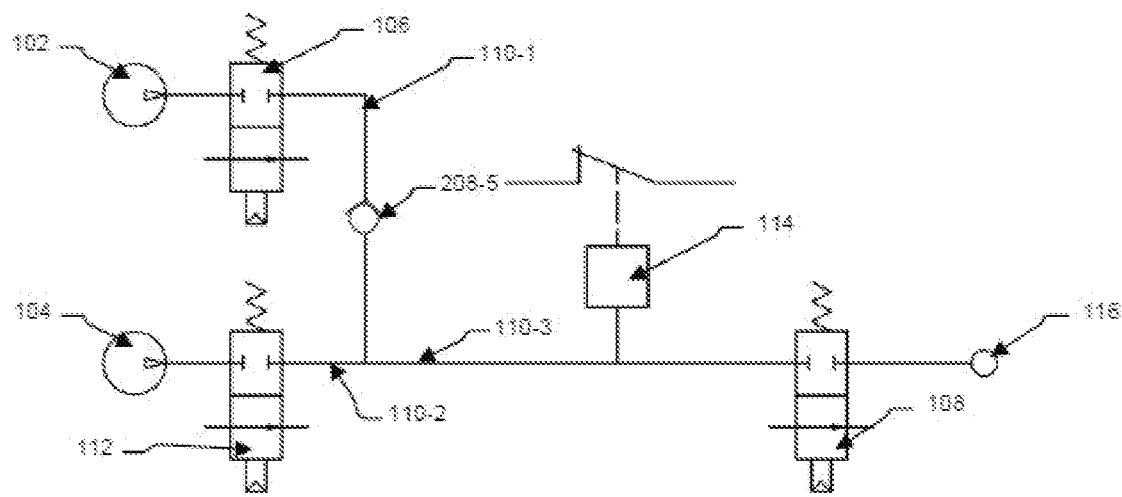
FIG. 2B illustrates line diagram of a second embodiment of the proposed system, in accordance with an exemplary embodiment of the present disclosure.

FIG. 2B illustrates line diagram of a second embodiment of the proposed system, in accordance with an exemplary embodiment of the present disclosure.

As illustrated, in an embodiment, the first inlet 102 can allow inflow of the first fluid into the system 100. The first fluid flow enabler 106 can then facilitate the first fluid to flow through the first fluid path 110-1 to the common fluid path 110-3.

In an embodiment, the housing 120 can be configured to accommodate an optional second filter 208-5 for redundancy on the first fluid path 110-1, adjacent to the first fluid flow enabler 106.

In an embodiment, the second inlet 104 can allow inflow of the second fluid inside the system 100. The second fluid flow enabler 112 can then facilitate the second fluid to flow through the second fluid path 110-2. The system 100 can include a parameter sensor 114 on the common fluid path, adjacent to the third fluid flow enabler 108. The parameter sensor 114 can be a pressure sensor, which can monitor pressure of the second fluid inside the system 100. The third fluid flow enabler 108 can further facilitate the flow of the second fluid through the common fluid path 110-3. The flow of the first fluid and the second fluid into the common fluid path 110-3 can result into dosing to produce a dosed fluid having a mixture of the first fluid and the second fluid or let them pass individually as and when required.

In an embodiment, the outlet 116 can facilitate outflow of the dosed fluid from the common fluid path 110-3 into a dosing line. The system can include a nozzle fluidically coupled to the at least one outlet 116 by the dosing line, to regulate the outflow of the dosed fluid.

Figure 3A:
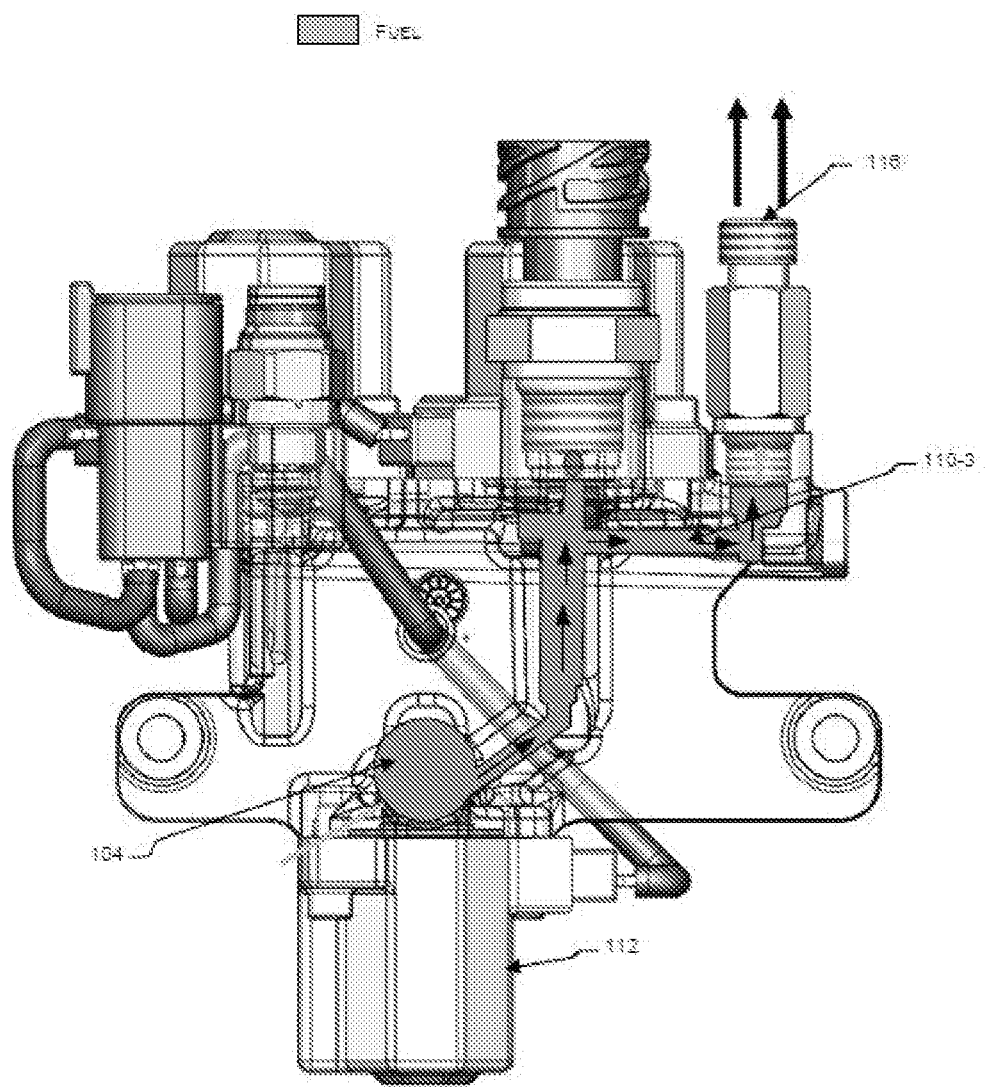
FIG. 3A-3B illustrate exemplary flow path of a second fluid inside a first embodiment and a second embodiment of the proposed system, in accordance with an exemplary embodiment of the present disclosure.
Figure 3B:
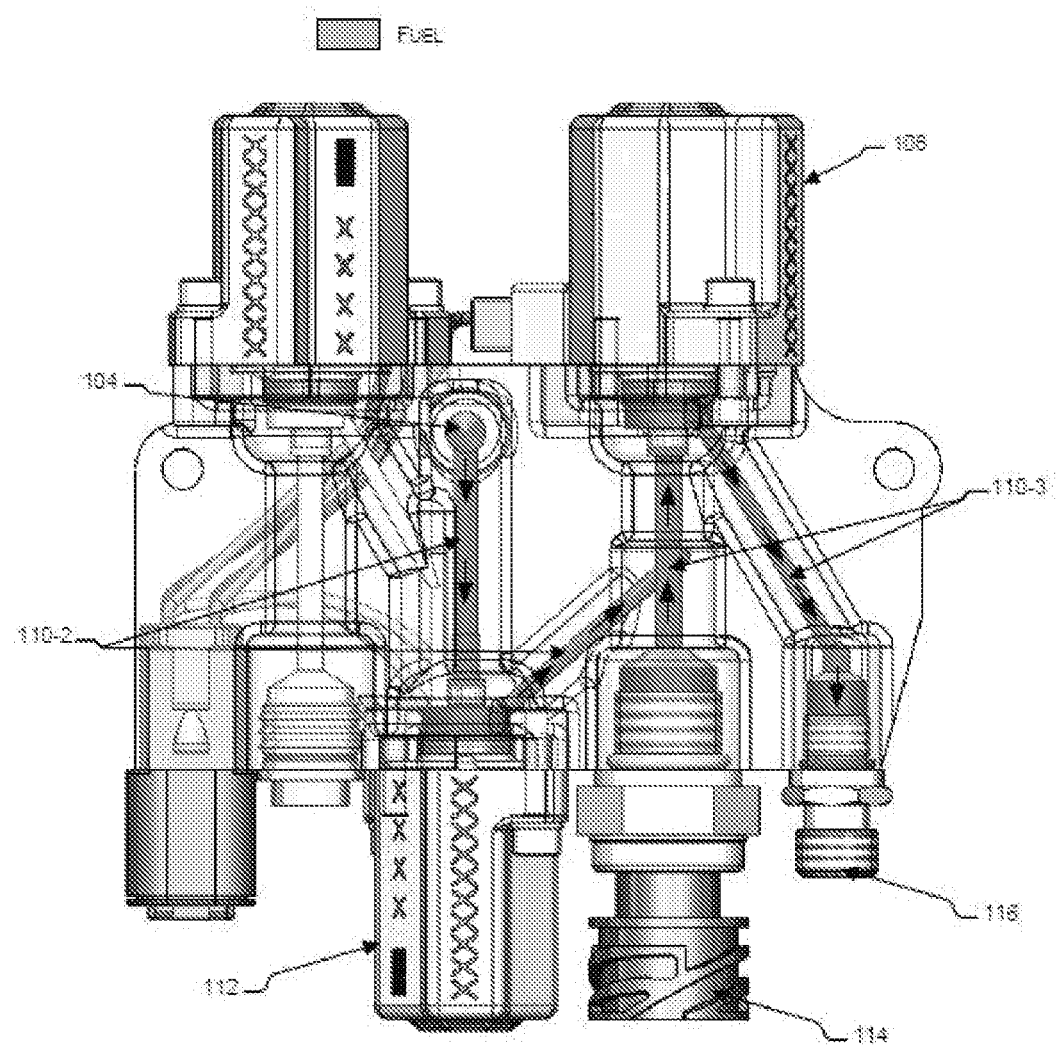

FIG. 3A-3B illustrate exemplary flow path of a second fluid inside a first embodiment and a second embodiment of the proposed system, in accordance with an exemplary embodiment of the present disclosure.

Referring to FIG. 3A and 3B, the flow of the second fluid inside the fluid path 110 of the first embodiment and the second embodiment of the proposed system are shown, respectively. In an embodiment, the second fluid flow enabler 112 can be activated to allow the second fluid to enter into the second fluid path 110-2 thorough the second inlet 104 and further control the flow of the second fluid inside the fluid path 110. The first fluid flow enabler 106 can be deactivated to restrict the flow of the first fluid inside the system such that only the second fluid can flow through the fluid path 110. In an embodiment, an in-built non-return valve (NRV) mechanism of the first fluid path 110-1 and first fluid flow enabler 106 can prevent flow of the second fluid into the first fluid path and/or beyond the first fluid flow enabler 106. The second fluid can flow from the second inlet 104 to the outlet 116 through the second fluid path 110-2 followed by the common fluid path 110-3.

In an embodiment, the system can include the optional second check valve 206-2 at least partially disposed in the second fluid path through the housing 120 between the second fluid enabler 112 and the pressure sensor 114.

Figure 4A:
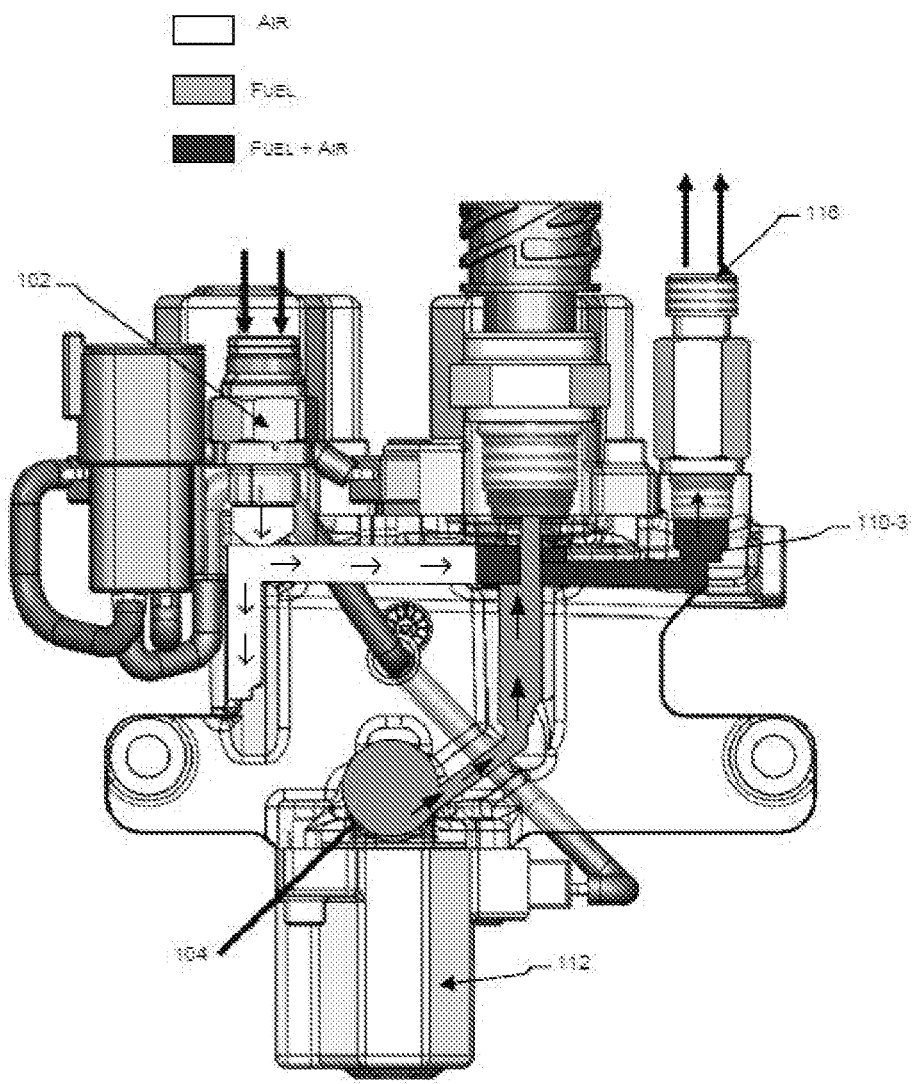
FIG. 4A-4B illustrate exemplary flow path of the first fluid and the second fluid inside a first embodiment and the second embodiment of the proposed system during purging operation, in accordance with an exemplary embodiment of the present disclosure.
Figure 4B:
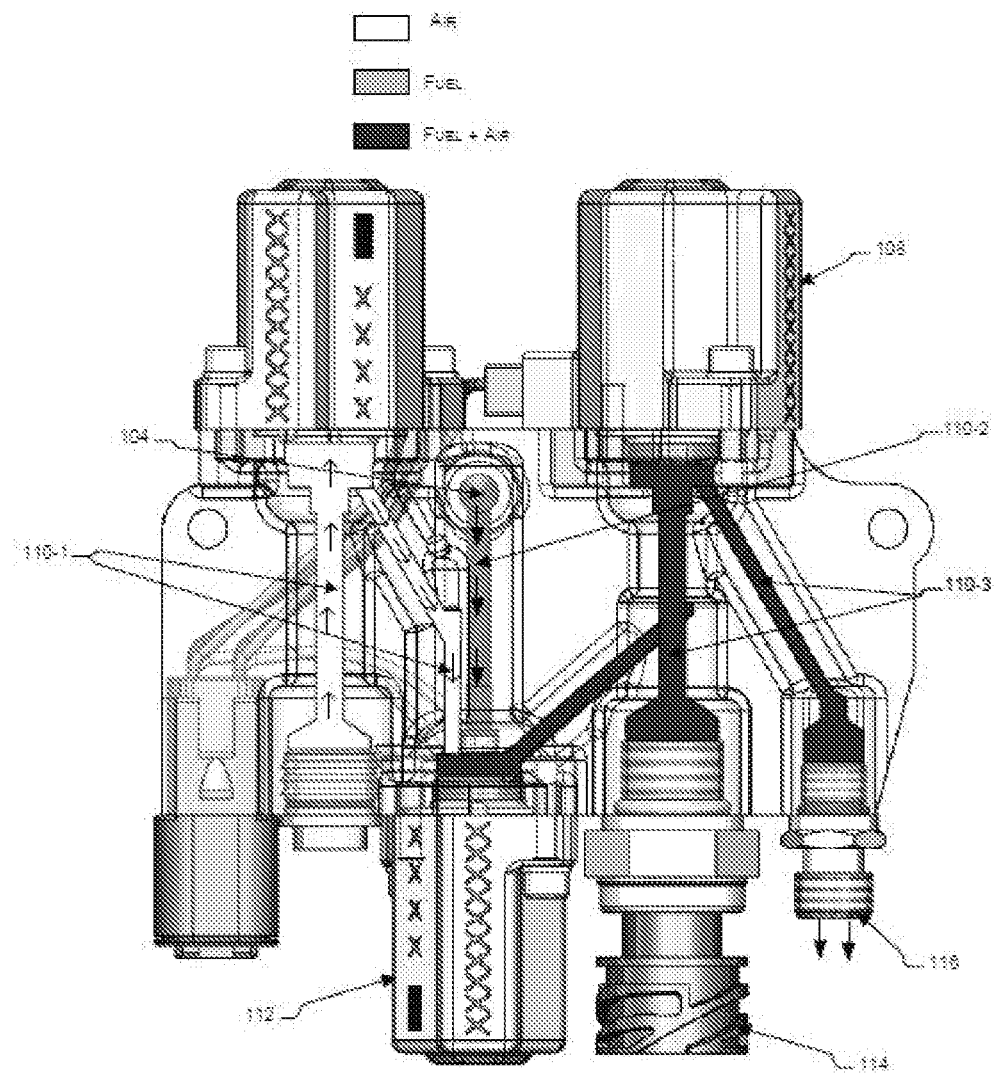

FIG. 4A-4B illustrate exemplary flow path of the first fluid and the second fluid inside a first embodiment and the second embodiment of the proposed system during purging operation, in accordance with an exemplary embodiment of the present disclosure.

Referring to FIG. 4A, the flow of the first fluid inside the fluid path 110 of the first embodiment of the proposed system is shown during the purging operation.

Referring to FIG. 4B, the flow of the first fluid inside the fluid path 110 of the second embodiment of the proposed system is shown during the purging operation.

In an embodiment, the second fluid flow enabler 112 can be activated to allow the second fluid to enter into the second fluid path110-2 through the second inlet 104 and further control the flow of the second fluid inside the fluid path 110. The first fluid flow enabler 106 can be activated to allow the first fluid to enter into the first fluid path 110-1 through the first inlet 102 and further control the flow of the first fluid inside the fluid path 110. In an embodiment, the first fluid and the second fluid can then enter the common fluid path 110-3 to result in dosing of the first fluid and the second fluid to produce the dosed fuel. The dosed fluid can then purge out of the outlet 116 and then through the nozzle.

In an embodiment, the system 100 can include a nozzle coupled to the outlet 116 through a dosing conduit to regulate the outflow of the dosed fluid from the outlet 116 to a vehicle oxidation catalyst.

In an exemplary embodiment, the first fluid can be air, and the second fluid can be a diesel fuel. The first fluid flow enabler 106 can be configured to act as an air purge valve to flush the air into the fluid path 110 of the system. The air and the diesel fuel can then enter the common fluid path 110-3 resulting in dosing of the air and fuel to produce the dosed fuel. The dosed fluid can then purge out of the at least one outlet 116 and then through the nozzle 204.

Figure 5A:
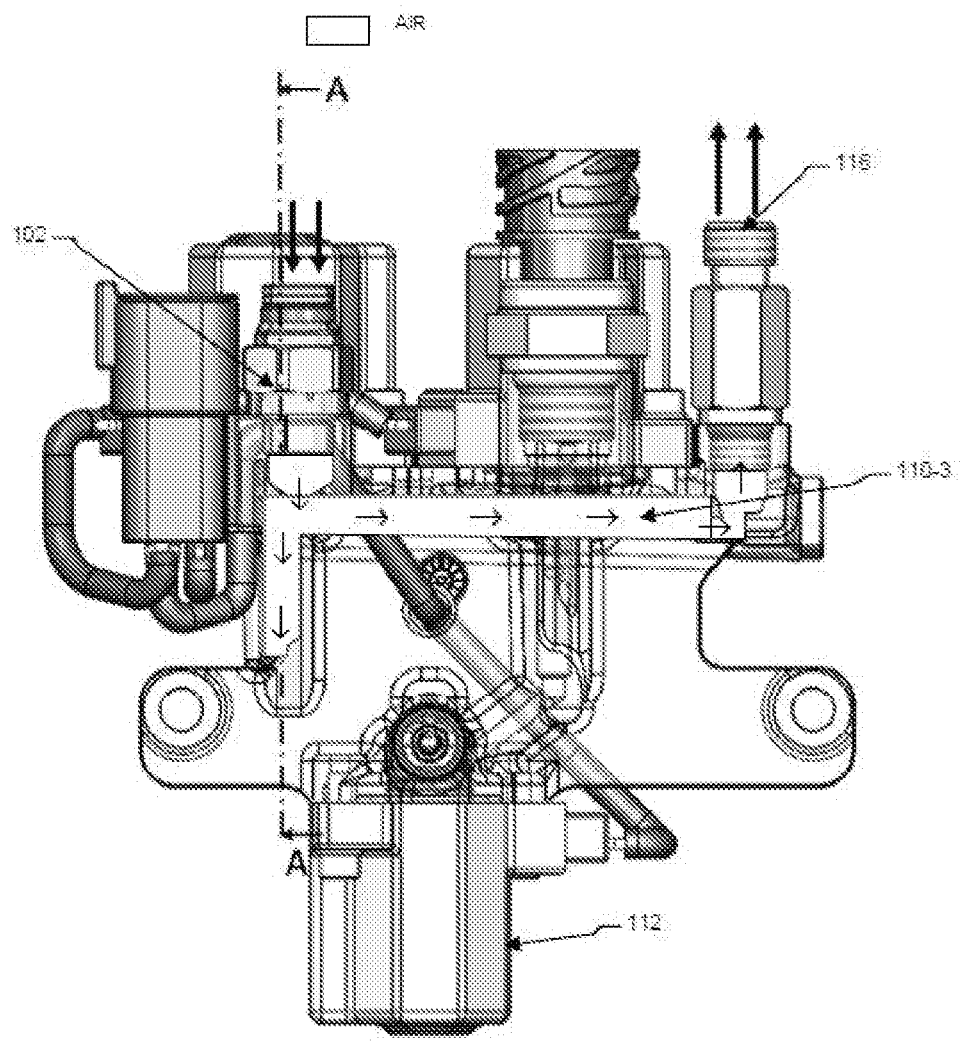
FIG. 5A-5B illustrate exemplary flow path of the first fluid inside a first embodiment and a second embodiment of the proposed system after completion of purging operation, in accordance with an exemplary embodiment of the present disclosure.
Figure 5B:
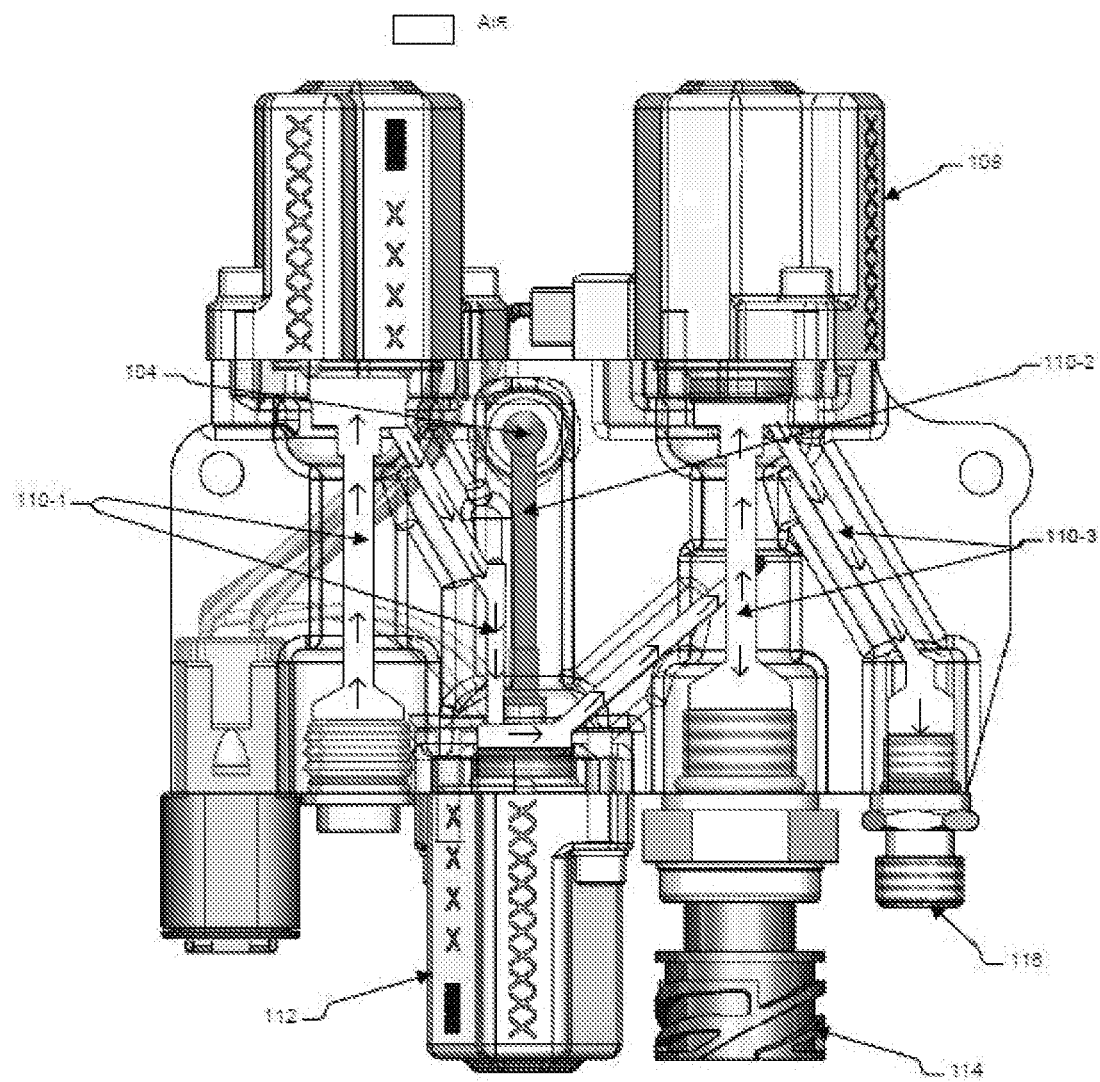

FIG. 5A-5B illustrate exemplary flow path of the first fluid inside a first embodiment and a second embodiment of the proposed system after completion of purging operation, in accordance with an exemplary embodiment of the present disclosure.

Referring to FIG. 5A, the flow of the first fluid inside the fluid path 110 of the first embodiment of the proposed system is shown after completion of the purging operation.

Referring to FIG. 5B, the flow of the first fluid inside the fluid path 110 of the second embodiment of the proposed system is shown after completion of the purging operation.

As illustrated, in an embodiment, the first fluid flow enabler 106 can be kept activated and/or can be activated after completion of the purging operation to allow the first fluid to flow inside the fluid path 110. Further, the second fluid flow enabler 112 can be deactivated after completion of the purging operation to restrict the flow of the second fluid inside the system 100 such that only the first fluid can flow through the fluid path 110. The first fluid can then flow from the first inlet 102 to the at least one outlet 116, the dosing line, and the nozzle through the first flow path 110-1 and the common fluid path 110-3 to clear the fluid path 110, the dosing line and the nozzle.

In an exemplary embodiment, the first fluid can be air. The flow of air from the first inlet 102 to the outlet 116, the dosing conduit and the nozzle through the first fluid path 110-1, the second fluid path 110-2, and the common fluid path 110-3 can facilitate clearing of the fluid path 110, dosing conduit and the nozzle.

Referring to FIG. 5A, after completion of purging, the first fluid can be kept on flowing from the first inlet 102 to the nozzle through the first fluid path 110-1, the common fluid path 110-3, the outlet 116, and the dosing conduit, which can facilitate clearing of the first fluid path 110, the common fluid path 110-3, the dosing conduit and the nozzle.

Referring to FIG. 5B, after completion of purging, the first fluid can be kept on flowing from the first inlet 102 to the nozzle through the first fluid path 110-1, the second fluid path 110-2, the common fluid path 110-3, the outlet 116, and the dosing conduit, which can facilitate clearing of the first fluid path 110, the second fluid path 110-2, the common fluid path 110-3, the dosing conduit and the nozzle.

Figure 6:
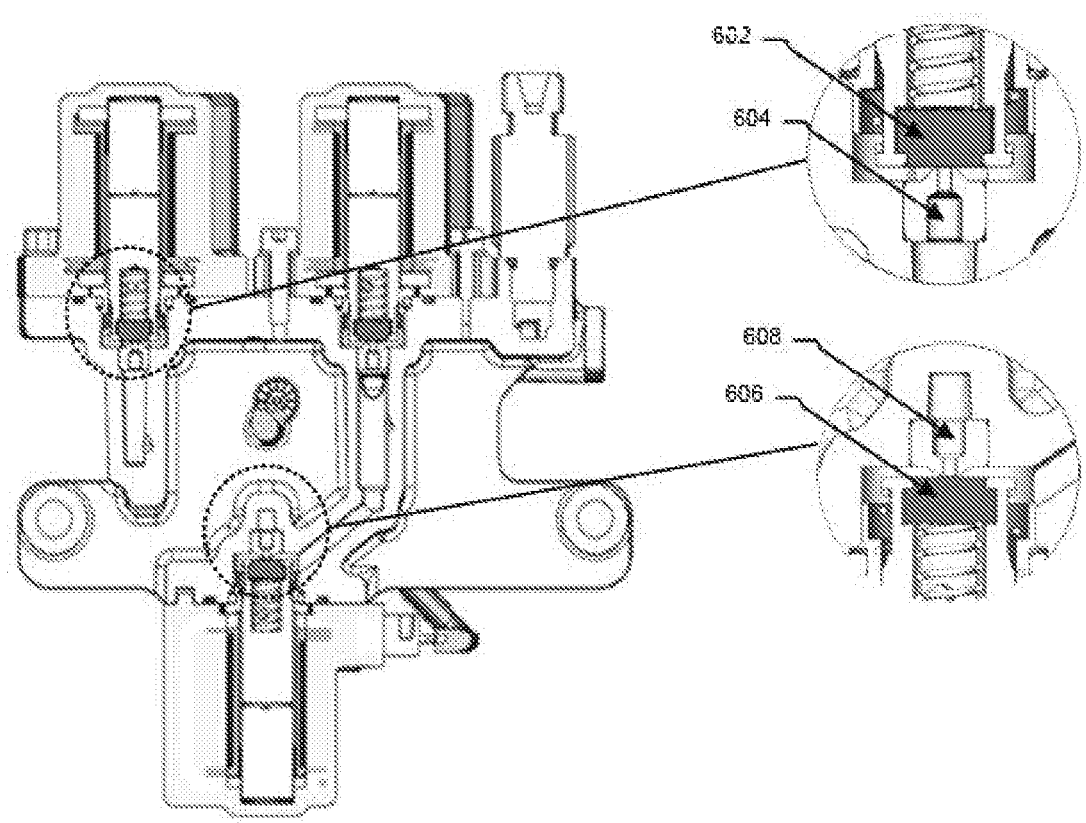
FIG. 6 illustrates an intrinsic non-return valve mechanism of a first embodiment of the proposed system, in accordance with an exemplary embodiment of the present disclosure.

FIG. 6 illustrates an intrinsic non-return valve mechanism of a first embodiment of the proposed system, in accordance with an exemplary embodiment of the present disclosure.

As illustrated, in an embodiment, the proposed system can include an in-built or intrinsic non-return valve (NRV) mechanism by suitably arranging the flow paths of the first fluids path 110-1, the second fluid path 110-2, and the common fluid path 110-3 to restrict flow of the second fluid into the first fluid path of the first fluid, and vice versa.

In an embodiment, the first fluid flow enabler 106 can include a first plunger 602 configured to seal a first orifice 604 of the first fluid flow enabler 106 due to a pressure applied by the second fluid, when the second fluid flows from the common fluid path 110-3 towards the first fluid path 110-1. Such arrangement can provide an intrinsic NRV mechanism to restrict the flow of the second fluid towards the first fluid path 110-1 of the first fluid without incorporating an additional NRV component.

In an embodiment, the second fluid flow enabler 112 can include a second plunger 606 configured to seal a second orifice 603 of the second fluid flow enabler 112 due to a pressure applied by the first fluid, thereby providing an intrinsic NRV mechanism to restrict the flow of the first fluid towards the second fluid path 110-2 of the second fluid, without incorporating an additional NRV component.

Figure 7:
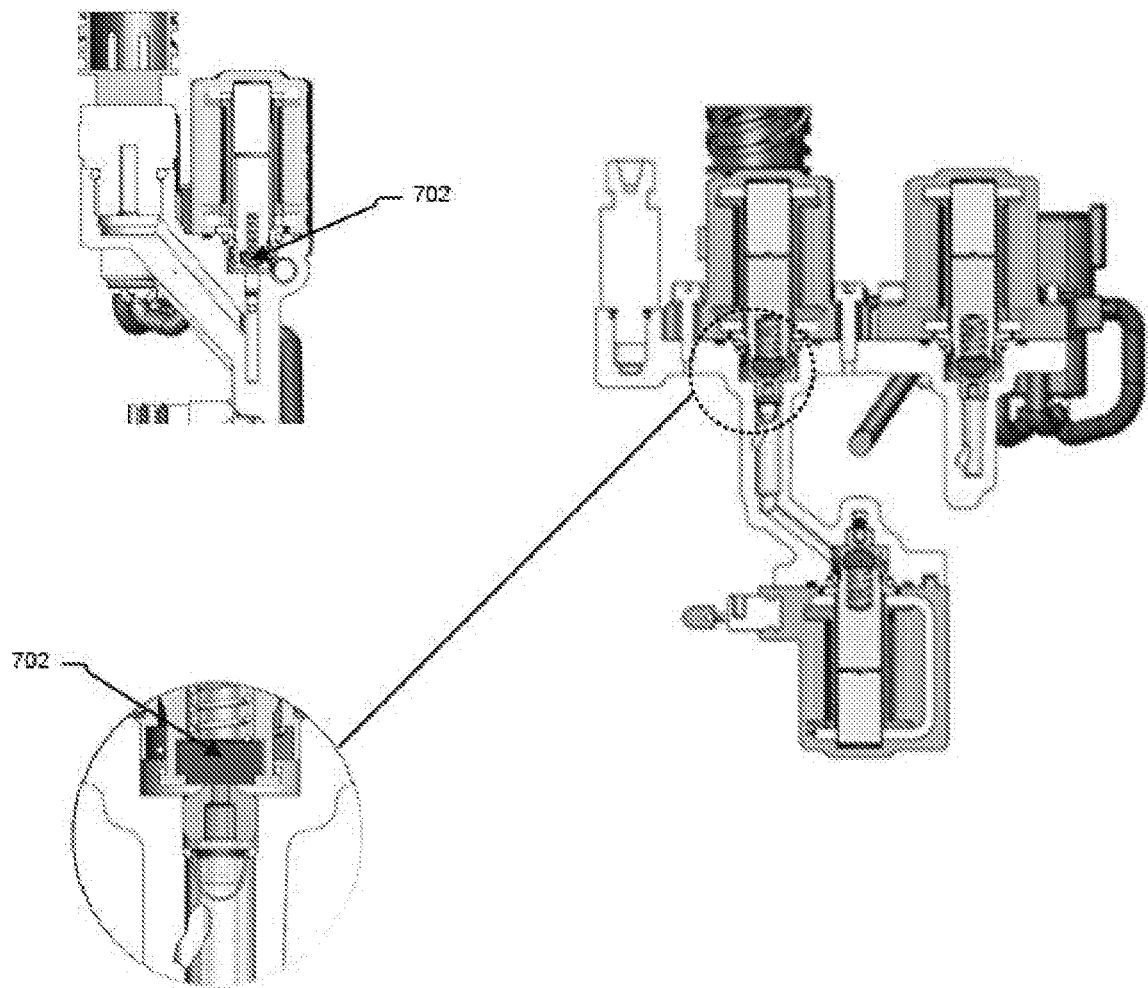
FIG. 7 illustrates an intrinsic pressure relief mechanism of a first embodiment of the proposed system, in accordance with an exemplary embodiment of the present disclosure.

FIG. 7 illustrates an intrinsic pressure relief mechanism of a first embodiment of the proposed system, in accordance with an exemplary embodiment of the present disclosure.

As illustrated, in another embodiment, the proposed system 100 can incorporate an in-built or intrinsic pressure relief valve mechanism to control and maintain the pressure of the second fluid inside the system. In an embodiment, an increase in the pressure around the pressure sensor 114 due to the second fluid above a predetermined pressure can enable a third plunger 702 of the third fluid flow enabler 108 to lift and facilitate controlled discharging of the second fluid from the system 100, thereby controlling the pressure of the second fluid inside the flow path 110 and the system 100. This intrinsic relief valve mechanism of the proposed system can prevent the pressure sensor 114 from damages.

In an embodiment, the intrinsic NRV mechanism of the system can restrict the flow of the first fluid in the second fluid path and vice versa in closed condition of the system. Further, the optional check valves 206-1-206-3 can provide the additional non return function if required to be achieved in ON condition of the system (although such requirement of check valve in ON condition is rare but additional safety through the check valves 206-1 to 206-3 can be provided)

In another embodiment, the pressure sensor 114 can be configured to monitor the pressure of the second fluid inside the fluid path 110 and send a corresponding first signal to the ECU. The ECU can send a second signal to the third fluid flow enabler 108 when the pressure of the second fluid inside the fluid flow 110 path increases beyond a predetermined pressure. The third fluid flow enabler 108 can be configured to facilitate lifting of its third plunger 702 upon receiving the second signal from the ECU to facilitate controlled discharging of the second fluid from the third fluid flow enabler 108, and thereby controlling the pressure of the second fluid inside the flow path 110 and the system 100, In an embodiment, at least one of the first fluid flow enabler 106, the second fluid flow enabler 112, and the second fluid flow enabler 108 can act as an intrinsic pressure relief valve when the pressure inside the system 100 exceeds the predetermined pressure.

Figure 8A:
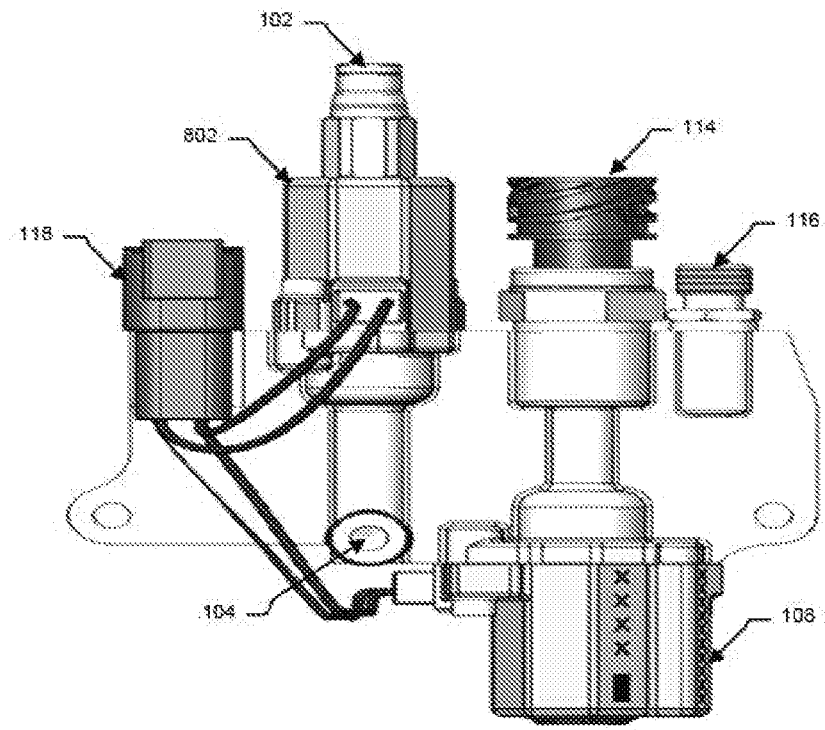
FIG. 8A-8B illustrates perspective views of a third embodiment of the proposed hydrocarbon dosing system with a 3/2 valve, in accordance with an exemplary embodiment of the present disclosure
Figure 8B:
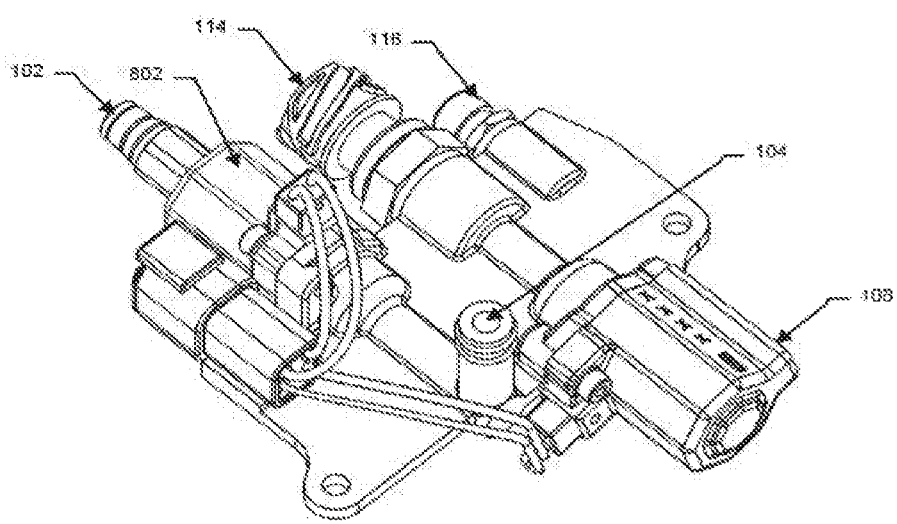

FIG. 8A-8B illustrates perspective views of a third embodiment of the proposed hydrocarbon dosing system with a 3/2 valve, in accordance with an exemplary embodiment of the present disclosure.

As illustrated, in an embodiment, the proposed system can include a 3/2 solenoid 802 fluidically coupled to the first inlet 102 and the second inlet 104. The 3/2 solenoid valve 802 can be configured to operate as a single device in place for the first fluid flow enabler and the second fluid flow enabler. The 3/2 solenoid valve 802 can include two valve inlets and a valve outlet. One of the two valve inlets can be fluidically coupled to the first inlet 102 and another valve inlet can be fluidically coupled to the second inlet 104. The valve outlet of the 3/2 solenoid valve 802 can be fluidically coupled to the outlet 116. The 3/2 valve inlet can enable flow of the first fluid in the fluid path through the first inlet 102, and flow of the second fluid in the fluid path through the second inlet 104.

In an exemplary embodiment, the 3/2 solenoid valve 802 can enable flow of the first fluid from the first inlet 102 to the outlet 116 in a deenergized condition. The 3/2 solenoid valve 802 can enable flow of the second fluid from the second inlet 102 to the outlet 116 in an energized condition In an embodiment, the 3/2 solenoid valve 802 can be energized and de-energized continuously after a pre-defined time to enable the inflow of both the first fluid and the second fluid inside the common fluid path 110-3 and facilitate dosing of the first fluid and the second fluid to provide a dosed fluid.

In an embodiment, the system 100 can further include a common fluid enabler 108 to control flow of any or a combination of the first fluid, the second fluid, and the dosed fluid in the fluid path, and also enable outflow of the dosed fluid from the outlet 116.

In an embodiment, the housing 120 can be configured to accommodate an optional non-return valve or check valve for redundancy to provide additional safety by preventing flow of the first fluid to the second inlet, and vice versa.

In an embodiment, the inlet ports of the 3/2 valve 802, and the common fluid enabler 108 can facilitate controlled discharge of the second fluid to release pressure of the second fluid inside the housing when the pressure exceeds the safety limits.

Figure 9:
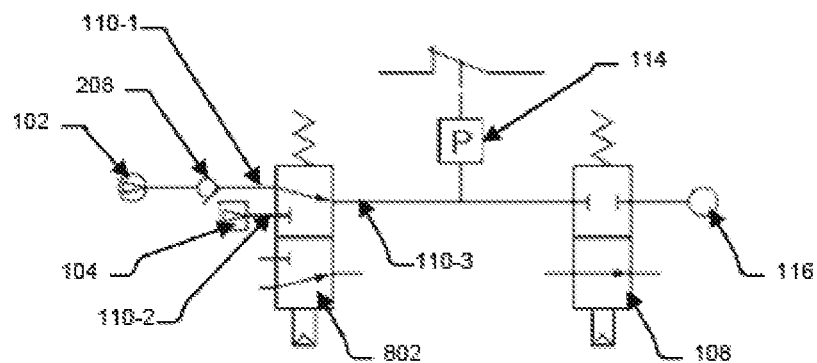
FIG. 9 illustrates a line diagram of a third embodiment of the proposed system, in accordance with an exemplary embodiment of the present disclosure.

FIG. 9 illustrates a line diagram of a third embodiment of the proposed system, in accordance with an exemplary embodiment of the present disclosure.

As illustrated, in an embodiment, the first inlet 102 can allow inflow of the first fluid into the system 100. The 3/2 valve 802 can then facilitate the first fluid to flow through the first fluid path 110-1 to the common fluid path 110-3 in a de-energized condition. The 3/2 valve 802 can further facilitate the second fluid to flow through the second fluid path 110-2 to the common fluid path 110-3 in an energized condition. The flow of the first fluid and the second fluid in the common fluid path 110-3 can enable dosing to provide a dosed fluid.

In an embodiment, the first fluid path 110-1 can include an optional check valve 208 for redundancy between the first inlet 102 and the 3/2 valve 802.

In an embodiment, the common fluid flow enabler 108 can control the flow of any or a combination of the first fluid, the second fluid, and the dosed fluid from the common fluid path 110-3 to the outlet 116. The system 100 can include a parameter sensor 114 positioned between the second fluid flow enabler 112 and the third fluid flow enabler 108. The parameter sensor 114 can be a pressure sensor, which can monitor pressure of the second fluid inside the system 100.

In an embodiment, the outlet 116 can facilitate outflow of the dosed fluid from the common fluid path 110-3 into a dosing line. The system can include a nozzle fluidically coupled to the at least one outlet 116 by the dosing line, to regulate the outflow of the dosed fluid.

Figure 10A:
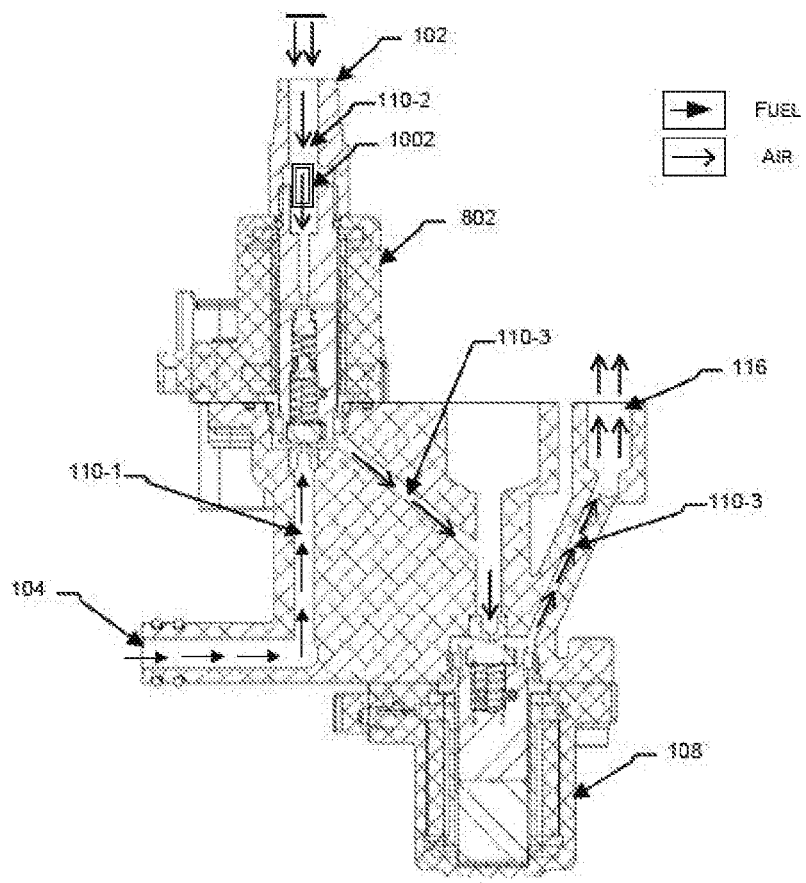
FIG. 10A illustrates an exemplary flow path of a first fluid inside the third embodiment of the proposed system, in accordance with an exemplary embodiment of the present disclosure.

FIG. 10A illustrates an exemplary flow path of a first fluid inside the third embodiment of the proposed system, in accordance with an exemplary embodiment of the present disclosure.

Referring to FIG. 10A, the flow of the first fluid inside the fluid path 110 of the third embodiment of the proposed system is shown. In an embodiment, the 3/2 valve 802 can be energized/activated to allow the first fluid to enter into the common fluid path 110-3 through the first inlet 102 and the first fluid path 110-1, and further control the flow of the first fluid inside the fluid path 110. The common fluid flow enabler 108 can be energized to allow flow of the first fluid from the common fluid path 110-3 to the outlet 116.

In an embodiment, an in-built non-return valve (NRV) mechanism of the first fluid path 110-1 and the first fluid flow enabler 106 can prevent flow of the first fluid into the second fluid path. The first fluid can flow from the first inlet 102 to the outlet 116 through the first fluid path 110-2 followed by the common fluid path 110-3.

In an exemplary embodiment, the flow of the first fluid inside the fluid path 110 can facilitate clearing of the fluid path 110, and the dosing conduit and nozzle coupled to the outlet.

In an embodiment, the housing 120 can be configured to accommodate an optional non-return valve or check valve for redundancy to provide additional safety by preventing flow of the first fluid to the second inlet, and vice versa. In an exemplary embodiment, the optional check valve 208 can be positioned at a neck 1002 of the first fluid path 110-1.

Figure 10B:
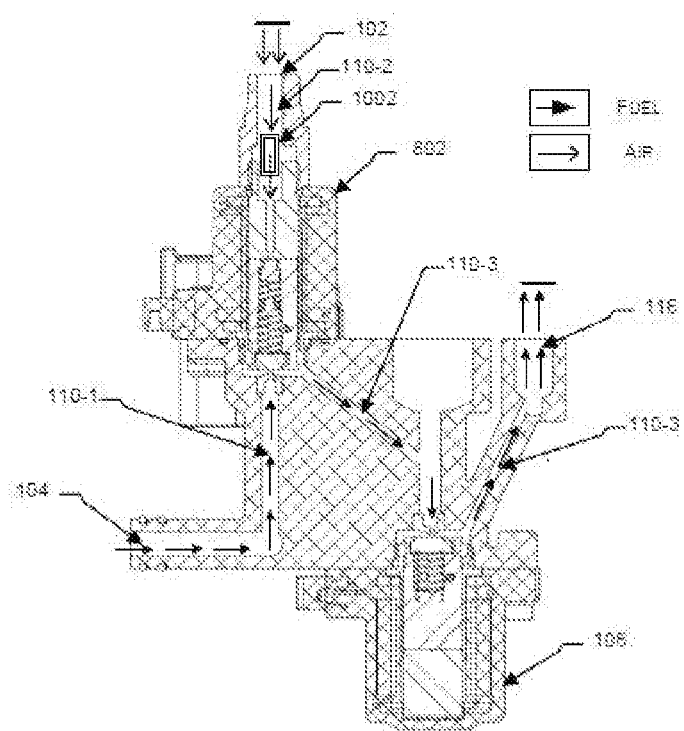
FIG. 10B illustrates an exemplary flow path of a second fluid inside the third embodiment of the proposed system, in accordance with an exemplary embodiment of the present disclosure.

FIG. 10B illustrates an exemplary flow path of a second fluid inside the third embodiment of the proposed system, in accordance with an exemplary embodiment of the present disclosure.

Referring to FIG. 10B, the flow of the second fluid inside the fluid path 110 of the third embodiment of the proposed system is shown. In an embodiment, the 3/2 valve 802 can be de-energized/de-activated to allow the second fluid to enter into the common fluid path 110-3 thorough the second inlet 104 and the second fluid path 110-2, and further control the flow of the second fluid inside the fluid path 110. The common fluid flow enabler 108 can be energized to allow flow of the second fluid from the common fluid path 110-3 to the outlet 116. The second fluid can flow from the second inlet 104 to the outlet 116 through the second fluid path 110-2 followed by the common fluid path 110-3.

Figure 11:
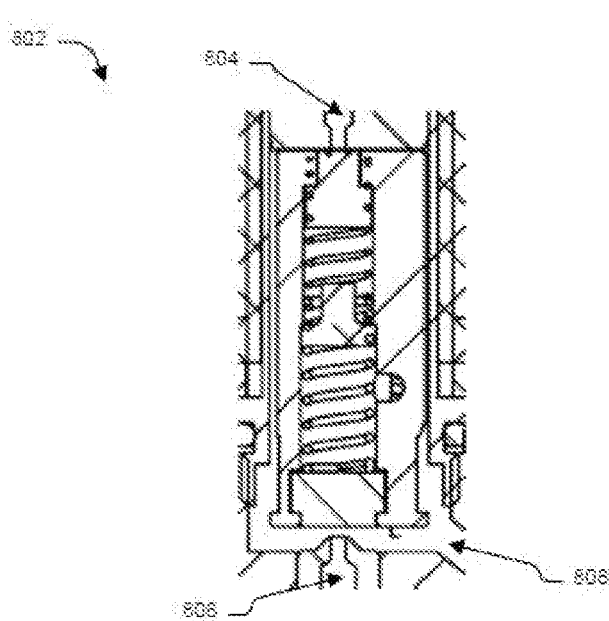
FIG. 11 illustrates an exemplary 3/2 solenoid valve of the third embodiment of the proposed system, in accordance with an exemplary embodiment of the present disclosure.

FIG. 11 illustrates an exemplary 3/2 solenoid valve of the third embodiment of the proposed system, in accordance with an exemplary embodiment of the present disclosure.

As illustrated, the 3/2 solenoid valve 802 of the proposed system can include two valve inlets 804, 806, and a valve outlet 808. The first valve inlet 804 can be configured to be fluidically coupled to the first inlet 102 of the system 100 and enable flow of the first fluid into the system when the 3/2 solenoid valve 802 is in a de-energized condition. The second valve inlet can be configured to be fluidically coupled to the second inlet 104 of the system 100 and enable flow of the second fluid into the system when the 3/2 solenoid valve 802 is in the energized position.

In an embodiment, the valve outlet 808 can be configured to be fluidically coupled to the fluid path 110 of the system 100 and enable flow of any or a combination of the first fluid and the second fluid into the fluid path 110 of the system 100.

While the foregoing describes various embodiments of the invention, other and further embodiments of the invention may be devised without departing from the basic scope thereof The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

ADVANTAGS OF THE INVENTION

The present disclosure provides a hydrocarbon dosing system to control dosing of diesel fuel into an exhaust upstream of a. vehicle's oxidation catalyst.

The present disclosure provides a hydrocarbon dosing system that has minimum leakage possibilities in the fluid paths.

The present disclosure provides a hydrocarbon dosing system that provides intrinsic non-return valve (NRV) mechanism without any additional non-return check valves.

The present disclosure provides a hydrocarbon dosing system that provides intrinsic pressure relief valve mechanism without any additional pressure relief valves.

The present disclosure provides a hydrocarbon dosing system that has provision for accommodation of optional check valves for additional safety.

The present disclosure provides a hydrocarbon dosing system that has a flow path of minimum resistance and length, and reduced weight and size.

The present disclosure provides a hydrocarbon dosing system that has reduced air consumption for purging.

The present disclosure provides a hydrocarbon dosing system that facilitates deploying of minimum number of electrical devices so as to have minimum failure possibilities.

The present disclosure provides a hydrocarbon dosing system that facilitates injection of only one fluid or two fluids together, as required.

I claim:

1. A hydrocarbon dosing system, the system comprising:
   a housing 120 comprising a first inlet 102 to facilitate inflow of a first fluid into the housing 120, a second inlet 104 to facilitate inflow of a second fluid into the housing 120, and an outlet 116 to facilitate outflow of any or a combination of the first fluid and the second fluid from the housing, wherein the first inlet 102, the second inlet 104, and the outlet 116 are fluidically coupled to each other through a first conduit 110;
   at least one fluid flow enabler 106, 112, 802 disposed at least partially inside the housing 120 and operatively coupled to the first inlet 102 and the second inlet 104, the at least one fluid flow enabler 106, 112, 802 configured to control flow of any or a combination of the first fluid, and the second fluid from the first inlet and the second inlet to the outlet 116; and
   a common fluid flow enabler 108 disposed at least partially inside the housing 120, the common fluid flow enabler 108 configured to control flow of the first fluid and the second fluid inside the housing 120 to facilitate dosing of the first fluid and the second fluid to provide a dosed fluid;
   wherein the at least one fluid flow enabler comprises a first plunger configured to seal a first orifice of the at least one fluid flow enabler due to pressure applied by the second fluid, thereby providing a non-return valve mechanism to restrict flow of the first fluid towards the second inlet 104, and restrict flow of the second fluid towards the first inlet 102.

2. The system 100 as claimed in claim 1, wherein the system 100 comprises at least one pressure sensor 114 to monitor pressure of any or a combination of the first fluid and the second fluid inside the housing 120.

3. The system 100 as claimed in claim 2, wherein the system 100 is configured to provide an intrinsic pressure relief valve mechanism to control pressure of the second fluid inside the housing 120 and enable controlled discharge of the second fluid from the housing 120 when the pressure of the second fluid inside the housing 120 exceeds a predefined pressure.

4. The system 100 as claimed in claim 2, wherein the system 100 comprises a control unit 118 operatively coupled to the at least one fluid flow enabler 106, 112, 802, the common fluid flow enabler 108, and the at last one pressure sensor 114, and wherein the control unit 118 is configured to control the at least one fluid flow enabler 106, 112, 802, and the common fluid flow enabler 108 to regulate the flow of any or a combination of the first fluid and the second fluid through the system 100.

5. The system 100 as claimed in claim 1, wherein the at least one fluid flow enabler 106, 112, 802 and the common fluid flow enabler 108 are solenoid valves, and wherein the at least one fluid flow enabler 106, 112, 802 comprises:
   a first fluid flow enabler 106 operatively coupled to the first inlet 102 and configured to control flow of the first fluid in the housing 120; and
   a second fluid flow enabler 112 operatively coupled to the second inlet 104 and configured to control flow of the second fluid in the housing 120.

6. The system 100 as claimed in claim 1, wherein the at least one fluid flow enabler is a 3/2 solenoid valve 802 provided with a valve outlet 808, and two valve inlets 804, 806 comprising a first valve inlet 804 and a second valve inlet 806, and wherein the first valve inlet 804 is fluidically coupled to the first inlet 102, the second valve inlet 806 is fluidically coupled to the second inlet 104, and the valve outlet 808 is fluidically coupled to the outlet 116.

7. The system 100 as claimed in claim 1, wherein the housing 120 is configured to accommodate at least one check valve 208, and wherein the at least one check valve 208 is configured to restrict flow of the first fluid towards the second inlet 104, and flow of the second fluid towards the first inlet 102, when the system is in operating condition.

8. The system 100 as claimed in claim 1, wherein the system 100 comprises a nozzle coupled to the outlet 116 through a dosing conduit to regulate outflow of any or a combination of the first fluid, the second fluid, and the dosed fluid from the outlet 116.

9. The system 100 as claimed in claim 1, wherein the at least one fluid flow enabler 106, 112, 802 is configured to allow flow of the first fluid from the first inlet 102 to the outlet 116 to facilitate purging of any or a combination of the first conduit 110, the outlet 116, the dosing conduit, and the nozzle.

10. A hydrocarbon dosing system, the system comprising:
    a housing 120 comprising a first inlet 102 to facilitate inflow of a first fluid into the housing 120, a second inlet 104 to facilitate inflow of a second fluid into the housing 120, and an outlet 116 to facilitate outflow of any or a combination of the first fluid and the second fluid from the housing, wherein the first inlet 102, the second inlet 104, and the outlet 116 are fluidically coupled to each other through a first conduit 110;
    at least one fluid flow enabler 106, 112, 802 disposed at least partially inside the housing 120 and operatively coupled to the first inlet 102 and the second inlet 104, the at least one fluid flow enabler 106, 112, 802 configured to control flow of any or a combination of the first fluid, and the second fluid from the first inlet and the second inlet to the outlet 116; and
    a common fluid flow enabler 108 disposed at least partially inside the housing 120, the common fluid flow enabler 108 configured to control flow of the first fluid and the second fluid inside the housing 120 to facilitate dosing of the first fluid and the second fluid to provide a dosed fluid;
    wherein an increase in pressure of the second fluid inside the housing above a predefined pressure enables a plunger of the common fluid flow enabler, thereby providing an intrinsic pressure relief valve mechanism to control the pressure of the second fluid inside the housing 120 and enable controlled discharge of the second fluid from the housing 120 when the pressure of the second fluid inside the housing 120 exceeds the predefined pressure.

\* \* \* \* \*